Patented Jan. 12, 1926.

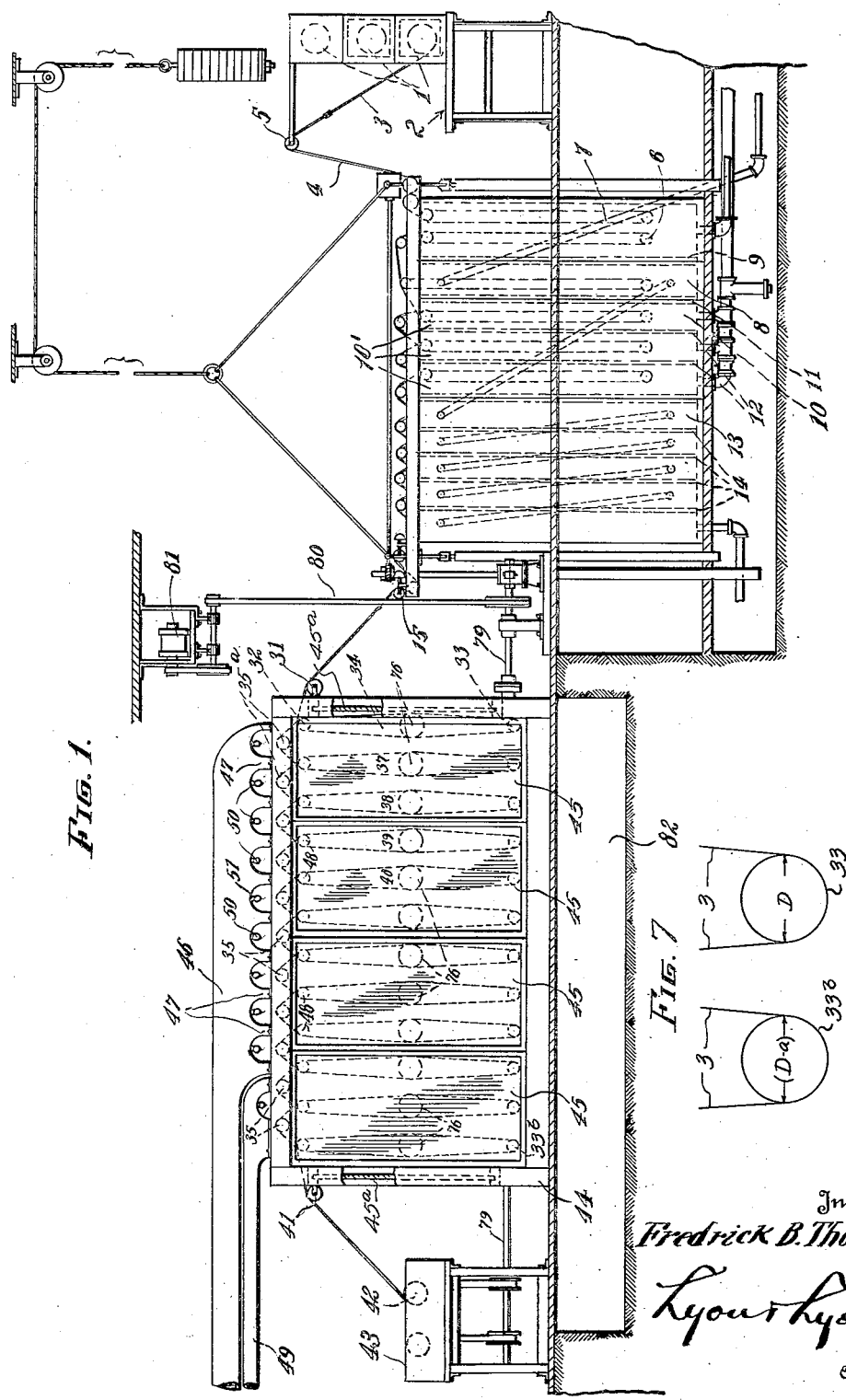

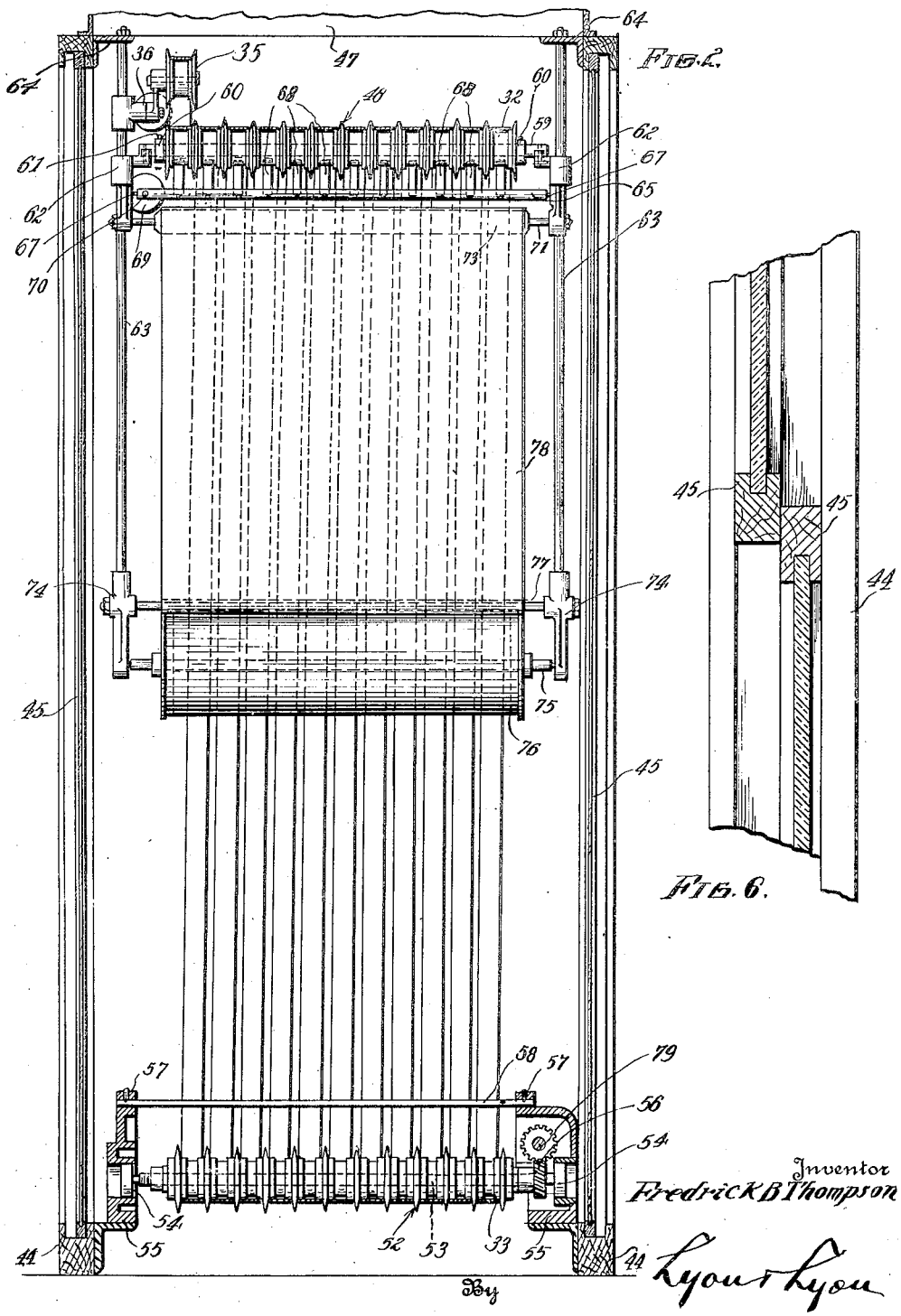

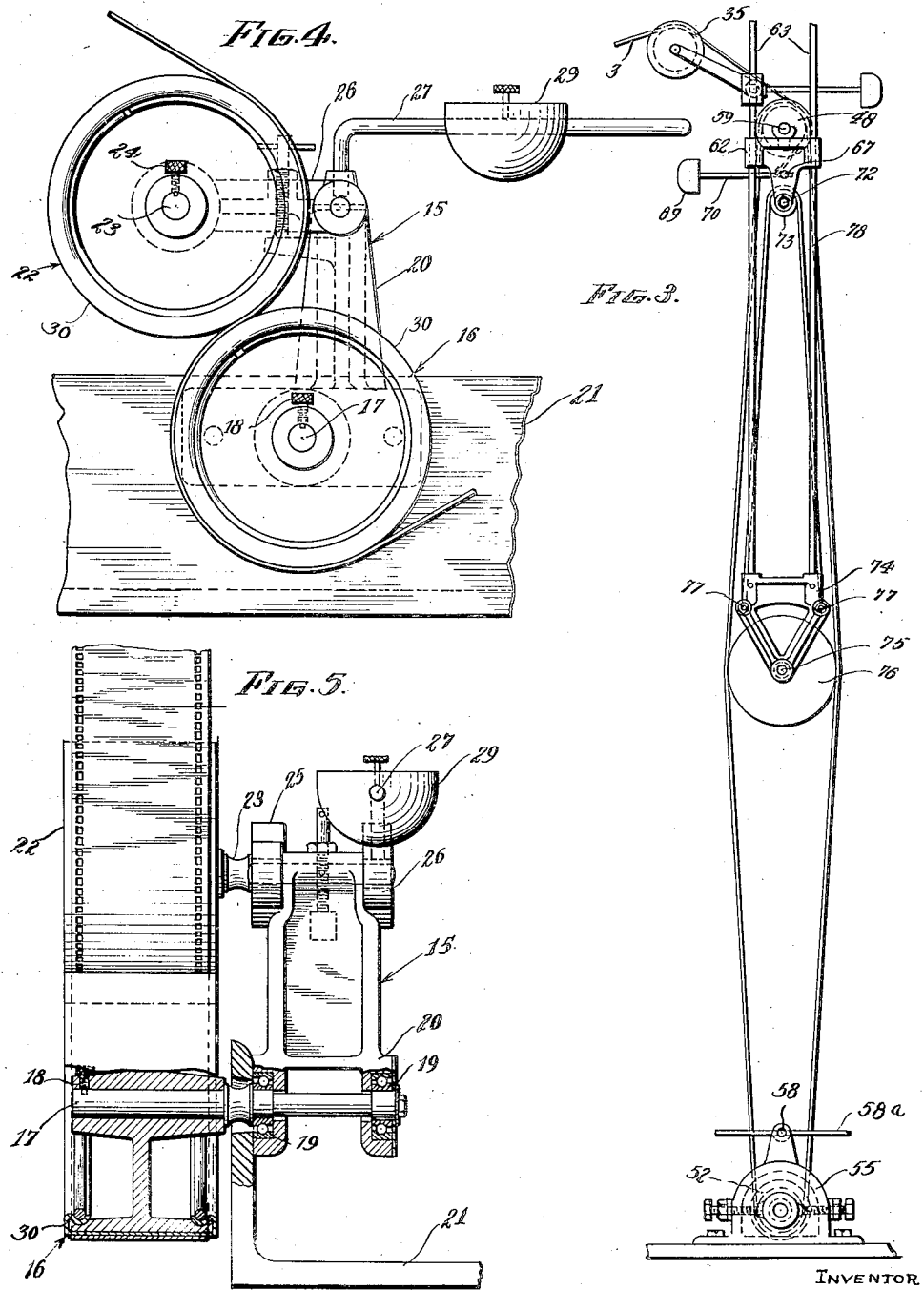

1,569,156

UNITED STATES PATENT OFFICE.

FREDRICK B. THOMPSON, OF LOS ANGELES, CALIFORNIA.

PHOTOGRAPHIC-FILM DRIER.

Application filed February 9, 1924. Serial No. 691,633.

*To all whom it may concern:*

Be it known that I, FREDRICK B. THOMPSON, a citizen of the United States, residing at Los Angeles, in the county of Los Angeles, State of California, have invented a new and useful Improvement in Photographic-Film Driers, of which the following is a specification.

This invention relates to an improved apparatus for drying photographic film tape of that kind which is employed for taking and projecting motion pictures.

In the treatment and drying of photographic film tape, great difficulty has been encountered to provide a machine for automatically developing, washing and drying these photographic film tapes. This difficulty may be principally due to the effect of change of length of the film tape during the developing and drying. The film tape, when run into the developing tank, expands in length, and on subsequent drying again contracts to its former length. For this reason, the film tape cannot be positively driven through a machine of this type, because the film tape breaks when so positively driven. However, it is deemed highly advisable to provide a drive mechanism for imparting motion to the film tape which is relatvely so arranged as to be dependent upon tension imparted to the film tape for producing a sufficiently strong frictional contact between the same and said drive mechanism to cause said film tape to be driven. The reason for this requirement is that the film tape is very sensitive and easily scratched or disfigured; and while many machines have been devised for transporting the film tape through the machine on a carrier ribbon, these have proven more or less unsatisfactory, due to scratching and contact with the very sensitive film surface.

This invention relates particularly to a machine wherein the film tape taken from the reel is run into a developing tank, and developed; then rinsed, then run through a fixing solution and then washed; what applicant calls the "wet end". This is the subject matter of applicant's copending application filed February 9, 1924, Serial No. 691,634. The complete machine, then, consists of a wringer for removing the surplus surface water from the film tape and a subsequent drying chamber; this latter part having to do entirely with this drying of the film is the subject of this application.

An object of this invention is to provide a wringer in connection with a film drying chamber to remove all of the surface water from the film, removing all the drops of water so that the film, when subsequently dried, is not "spotted."

An object of this invention is to provide a driving mechanism so constructed as to compensate for the change of length of the film tape on travel therethrough.

An object of this invention is to provide a drying mechanism into which air, properly conditioned, is admitted.

An object of this invention is to provide a drying mechanism such that light may be provided therein to enable the operator to see if the film is properly dried and treated.

An object of the invention is to provide a film drying mechanism which is enclosed in a glass cabinet, having doors, so that the operator may get to the film and so that the film may be seen throughout its travel through the drier.

Other objects and advantages of this invention will be apparent from the following detailed description of a preferred embodiment of this invention, of which description the accompanying drawings form a part.

In the drawings, similar numbers and figures refer to the same parts throughout:

Figure 1 is a side elevation of film treating apparatus embodying my invention and shows containers for liquids for developing, rinsing, fixing and washing the film, and the wringer and drying chamber for the same.

Fig. 2 is an end elevation, partly in section, showing one unit of the film drying mechanism as embodied in this invention and illustrating a drive mechanism of the bottom rollers.

Fig. 3 is a side elevation of the unit shown in Figure 2, showing a braking means in connection with the top rollers, and a weighted idle roller for maintaining a friction contact with the film tape, and illustrating an apron to act as a "wind deflector" for the conditioned air.

Fig. 4 is a side elevation of the wringer mechanism as embodied in this invention.

Fig. 5 is an end elevation of the wringer as shown in Figure 4.

Fig. 6 is an enlarged fragmental end elevation showing a manner of mounting the glass doors embodied in this invention.

Figure 7 is a diagrammatic view illustrating the relative sizes of the driving rollers embodied in this invention.

Film reels 1 are held in a suitable carriage 2, on which reels 1 the film 3, to be sensitized or developed and dried, is wound. A thread tape or film 4 is threaded through the entire mechanism, first passing over a roller 5 to position the film. From the roller 5 the film is threaded over the rollers 6 in the developing tank 7, in which the film 3 is developed. The film 3 is then rinsed in a rinsing tank 8, which tank 8 is separated from the tank 7 by the partition 9. The film then travels to the fixing tank 10, separated from the tank 8 by the partition 11. The fixing tank 10 may be divided into three separate tanks 10' by the partitions 12. The film is then washed in a series of wash tanks 13, separated by the partitions 14. The film, thoroughly washed, then passes to the wringers 15 by means of which the water carried on and by the film tape is thoroughly removed, no bubbles or drops of water remaining on the film tape. The construction of these wringers is substantially as follows:

A roller 16 is secured to a shaft 17 by means of a set screw 18. The shaft 17 is journaled in suitable bearings 19, which bearings 19 are shown in Figure 5 as ball bearings. The bearings 19 are held in the bracket 20, which bracket 20 is secured to the angle iron 21. A second roller 22 is secured to the shaft 23 by a set screw 24. The shaft 23 is suitably journaled in bearings 25, which are suitably held in the arm 26, which arm 26 is pivoted to the upper end of the bracket 20. The second roller 22 is so positioned as to press against the roller 16 so as to provide the wringing pressure on the film tape 3.

The travel of the film tape through the wringer causes the rollers 16 and 22 to revolve. To closely regulate the weight, an arm 27 is secured to the arm 26 in such a manner as to allow a counterbalancing of the weight of the roller 22. A weight 29 is loosely journaled on the arm 27 to allow a regulation of the wringing pressure, as heretofore stated. The rollers 16 and 22 are covered with a material 30 (such as chamois) which, while absorbent in character, will not scratch or mar the film as traveling through the wringer. The chamois may be held to the rollers in any desired manner.

The film tape 3 leaving the wringer travels over a roller 31 into the drier, wherein it travels over the top roller 32, down and around a bottom roller 33, and is then successively trained over the top and bottom rollers substantially as shown in Fig. 2 of the drawings. Passing from the first drying unit 34, the film tape 3 is passed over an idle roller 35ª, which roller 35ª is mounted on a pivoted arm 36 and has a counterbalance arm similar to that employed in connection with the top wringer roller 22.

The film tape is trained over a number of similar drying units 37, 38, 39, 40, etc., the number of such units being dependent on the speed with which the film is to travel through the drier. The film dried leaves the drier over a roller 41 and is wound on a friction drive take-up reel 42, there being two of these reels 42 positioned on a table 43 so that when one reel is filled the film may be immediately wound on the second reel 42.

The film drier is constructed in a novel manner, as will now be described:

A frame 44, having glass doors 45 (or doors of other transparent material) encloses the drying mechanism. An air duct 46 is formed on the top of the frame 44 and is supplied with air properly conditioned from any suitable source (not shown). The air duct 46 is divided into sections by the cross members 47, the members 47 being preferably constructed so as to admit the air directly over the top rollers 48. A second duct 49 may be used to admit air, specially conditioned, at the end of the drier.

Lights 50 mounted in sockets 51 are positioned in the members 47 so as to illuminate the drier so that the film tape may be seen throughout its travel through the drier.

The bottom rollers 52 are keyed to the shafts 53, which shafts 53 are journaled in suitable bearings 54, held in brackets 55, which brackets 55 are secured to the frame 44 of the drier. The shafts 53 are driven in any suitable manner, such as by the worm 56 shown in Figure 2. Secured to the brackets 55 in some such manner as shown at 57 is a bar 58, having a cross guide rod 58ª, to hold the film tape 3 apart at this point, and guide the travel of the film.

The upper rollers 48 are loosely journaled on the shafts 59, said rollers 48 being held in their proper positions on the shafts 59 by means of the collars 60, the collars 60 being secured to the shafts 59 by means of the set screws 61. The shafts 59 are rigidly secured to the brackets 62, which are secured to rods 63, which rods 63 are held in position by the angle iron 64 secured to the frame 44, as shown in Figure 2.

A rod 65 is pivoted to the bracket 62, as shown at 67. Brake fingers 68 are secured to the rod 65, and adapted to press against the rollers 48 to arrest the rotation thereof. The pressure of the brake fingers 68 against the rollers 48 is regulated by means of a weight 69 slidably journaled on a rod 70, so that the weight of the weight 69 is transmitted through the pivoted relation of the rod 65 to the brake fingers 68.

A rod 71 is secured to the brackets 62, as shown at 72, and a spacing roll 73 is secured thereto. At the lower end of the rods 63 are brackets 74, to which brackets 74 a rod 75 is rigidly secured. A spacing roll 76 is journaled to this rod 75 to space the film tape 3 at this point and is free to rotate on the rod 75 so as not to resist the travel of the film tape 3. A second pair of rods 77 are secured to these brackets 74 to reinforce the connections.

An apron of cloth 78 passes over the roll 73 and rod 77 and acts as an air deflector, deflecting the air from the ducts 46 onto the film.

The frame 44 of the drier is fitted with glass throughout and, as previously set forth, has doors 45 on each side. The ends of the frame 44 are fitted with panes of glass 45ª as is illustrated in Figure 1.

In order to allow for the contraction of the film tape on drying, the bottom driven rollers 53 are made successively smaller as the film tape travels through the drier, and in the particular construction now in operation, the sets of lower rollers 53 on each shaft 54 are made .002 smaller in diameter proceeding from the start of the drier to the exit end.

The last set of rollers 53 (at the exit end of the drier) must be made smaller than the preceding sets of rollers 53 to allow the shrinkage to feed from this point back through the other sets of rollers 53 to compensate for the contraction of the film tape on drying, and to prevent the film from becoming tight on any set of rollers 53. For example, the sets of rollers 33 are constructed of a diameter D (see Fig. 7) and the last set of rollers in the drier are constructed of a diameter (D—a) where a is approximately .003 of an inch.

The lower rollers 53 are driven, as previously described, by the worms 56, the worms 56 being driven from the shaft 79, which shaft 79 is driven through suitable connections 80 by a motor 81.

The air from the ducts 46 and 49 is led from the drier through the passageway 82, which passageway is preferably located in the basement of the building, as shown in Figure 1 of the drawing.

Having fully described a preferred embodiment of this invention, it is to be understood that I do not wish to be limited to the exact construction herein set forth, which may obviously be varied in detail without departing from the spirit of this invention, as set forth in the appended claims.

I claim:—

1. In a photographic film drier, the combination of a frame, transparent sides secured to the frame, a plurality of film units mounted within the frame, and means for admitting air at the top of the frame directly over the separate units.

2. In a photographic film drier, the combination of a frame, having transparent side and end walls, an air duct at the top of the frame, a second air duct at the top of the said frame and at the film exit end of the drier, means for imparting motion to the film tape, and a take-up reel.

3. In a photographic film drier, the combination of a frame having transparent side and end walls, means for admitting air to the top of the drier, means mounted within the drier for lighting the interior of the drier, means for imparting motion to the film tape, and a take-up reel.

4. In a photographic film drier, the combination of a frame, means for admitting air into the drier from the top, means mounted within the drier for lighting the interior of the film drier, means for imparting motion to the film tape, and a take-up reel.

5. In a photographic film drier, the combination of a wringer comprising idle pressure rollers, an absorbent covering the rollers and a drying chamber, means of introducing conditioned air into the drier, means to impart motion to the film tape, and a frictionally driven take-up reel.

6. In a photographic film drier, the combination of means to remove the surface water from the film, means to admit air into the drying chamber, means to light the interior of the chamber, and a set of driven rollers to impart motion to the film tape.

7. In a photographic film drier, the combination of means to remove surface water drops from the film tape, a drying chamber, means to admit air into the top of the drying chamber, and a set of driven rollers imparting motion to the film tape.

8. In a photographic film drier, the combination of means to remove surface water drops from a film tape, a drying chamber having transparent side walls; an air duct admitting air into the top of the chamber to dry the film, a set of idle rollers, and a set of driven rollers imparting motion to the film tape.

9. In a photographic film drier, the combination of a drying chamber, means to admit air into the top of the chamber, means to light the chamber, a set of idle rollers, a series of sets of driven rollers, the sets decreasing in size toward the exit end of the drier, imparting motion to the film tape and means for directing the air over said units along the film tape.

10. In a photographic film drier, the combination of a drying chamber, means to admit air into the top of the chamber, means to direct the admitted air, a set of idle rollers, and a set of driven rollers imparting motion to the film tape.

11. In a photographic film drier, the combination of a drying chamber, an air duct in the top of the chamber, a second air duct in the front of the chamber, means to direct the flow of the air from the ducts, means to direct the air in the chamber, and means to impart motion to the film tape.

12. In a photographic film drier, the combination of a drying chamber, pressure wringer rollers removing drops of water from the film tape, means to drive the film tape, said movement of the film tape driving the pressure wringer rollers.

13. In a photographic film drier, the combination of a drying chamber, means for driving the film tape through the drier comprising a plurality of idle rollers, and a plurality of driven rollers adapted to compensate for the contraction of length of the film tape, and a take-up reel.

14. In a photographic film drier, the combination of means to remove surface water from the film, a drying chamber having transparent sides and ends, air ducts admitting air into the top of the chamber, means to direct the air onto the film tape, lights secured within the latter means, and means to drive the film through the drier.

15. In a photographic film drier, the combination of means to wipe the surface water from the film, a drying chamber having transparent sides and ends, an air duct admitting air into the top of the chamber, a second air duct admitting air into the chamber at the top of the chamber at the exit end. means to direct the air onto the film tape, lights secured within the air ducts, and means to drive the film through the drier.

16. In a photographic film drier, the combination of means to remove surface water from the film tape, a drying chamber having sides and ends, air ducts admitting air into the top of the chamber, means to direct the air against the film tape, lights secured within the latter of said means, a series of sets of idle film rollers, and a series of sets of driven rollers adapted to compensate for the contraction of the film tape during the drying.

17. In a photographic film drier, the combination of a drying chamber, air ducts admitting air to the top of the chamber, and means for removing the air so admitted from the bottom of the chamber, a series of sets of idle rollers, pressure braking means in connection with the idle rollers, and means to impart motion to the film tape.

18. In a photographic film drier the combination of a drying chamber, air ducts admitting air to the top of the chamber, transverse air directioning members, a series of sets of idle rollers, a series of sets of driven rollers, vertical air directioning members causing the air to flow along the film tape, and means to drive the film tape through the drier.

19. In a photographic film drier, the combination of a drying chamber, and a series of film carriage units connected by idler members, each unit comprising a set of idle rollers, a set of driven rollers, guide bars holding the film tape on the driven rollers, means between the driven and idle rollers holding the film tape in spaced relation, and means in connection with the idle rollers for arresting their motion.

20. In a photographic film drier, the combination of a drying chamber, air ducts admitting air into the top of the drier and a series of film tape carriage units connected by idler members, each unit comprising a set of idle rollers, a set of driven rollers, guide bars holding the film tape on the driven rollers, means between the idle and driven rollers holding the film tape in spaced relation, means in connection with the idle rollers for arresting their motion as imparted by the film tape, and means for directioning the air admitted along the travel of the film tape.

21. In a photographic film drier, the combination of a plurality of sets of idle and driven rollers, the last set of said driven rollers being of smaller external diameter than the preceding sets of driven rollers so as to compensate for the contraction of the film while drying.

22. In a photographic film drier, the combination of a plurality of sets of upper rollers, a plurality of sets of lower rollers, means for driving the lower rollers, the last set of said lower rollers being of smaller external diameter than the preceding sets of lower rollers so as to compensate for the contraction of the film while drying.

Signed at Los Angeles, California, this 1st day of February 1924.

FREDRICK B. THOMPSON.